United States Patent [19]

Bauman et al.

[11] 4,331,954
[45] May 25, 1982

[54] PLANAR COORDINATE RESOLVING SYSTEM

[76] Inventors: Verne W. Bauman, 887 Conestoga Cir., Newbury Park, Calif. 91320; Gary R. See, 659 Wilshire Pl., Newbury Park, Calif. 91320

[21] Appl. No.: 196,131

[22] Filed: Oct. 10, 1980

[51] Int. Cl.³ .............................................. G08C 9/00
[52] U.S. Cl. ..................................... 340/706; 178/20
[58] Field of Search ............... 340/700, 705, 706, 707, 340/709; 178/18, 19, 20

[56] References Cited

U.S. PATENT DOCUMENTS 3,553,680  1/1971  Cooreman ............................. 178/18
3,582,956  6/1971  Huston .................................. 178/18
3,613,066 10/1971  Cooreman ............................. 178/18

*Primary Examiner*—Alvin H. Waring
*Attorney, Agent, or Firm*—Albert O. Cota

[57] ABSTRACT

A planar coordinate resolving system capable of precise resolution of position coordinates of planar images, pictures, sketches, or graphical data. The system consists of a tracing board, to which is attached a dually-pivotable mechanical linkage arm combination, lying parallel to the tracing board and pivotably attached to the board at one arm end. The linkage arm combination is also pivotable at its approximate midsection and has a mechanical pointer at the free end. The pivotability allows full coverage of points on the tracing board by the pointer. A pair of electrical potentiometers located in housings on the linkage arms form the pivot mechanisms. As the arm sections are respectively pivoted, electrical analog signals, proportional to the potentiometer rotor shaft angular change, are applied to a computing device, allowing calculation of the position coordinate of the mechanical pointer location. The resolved images are ultimately displayed on a CRT display or hard-copy printer.

9 Claims, 5 Drawing Figures

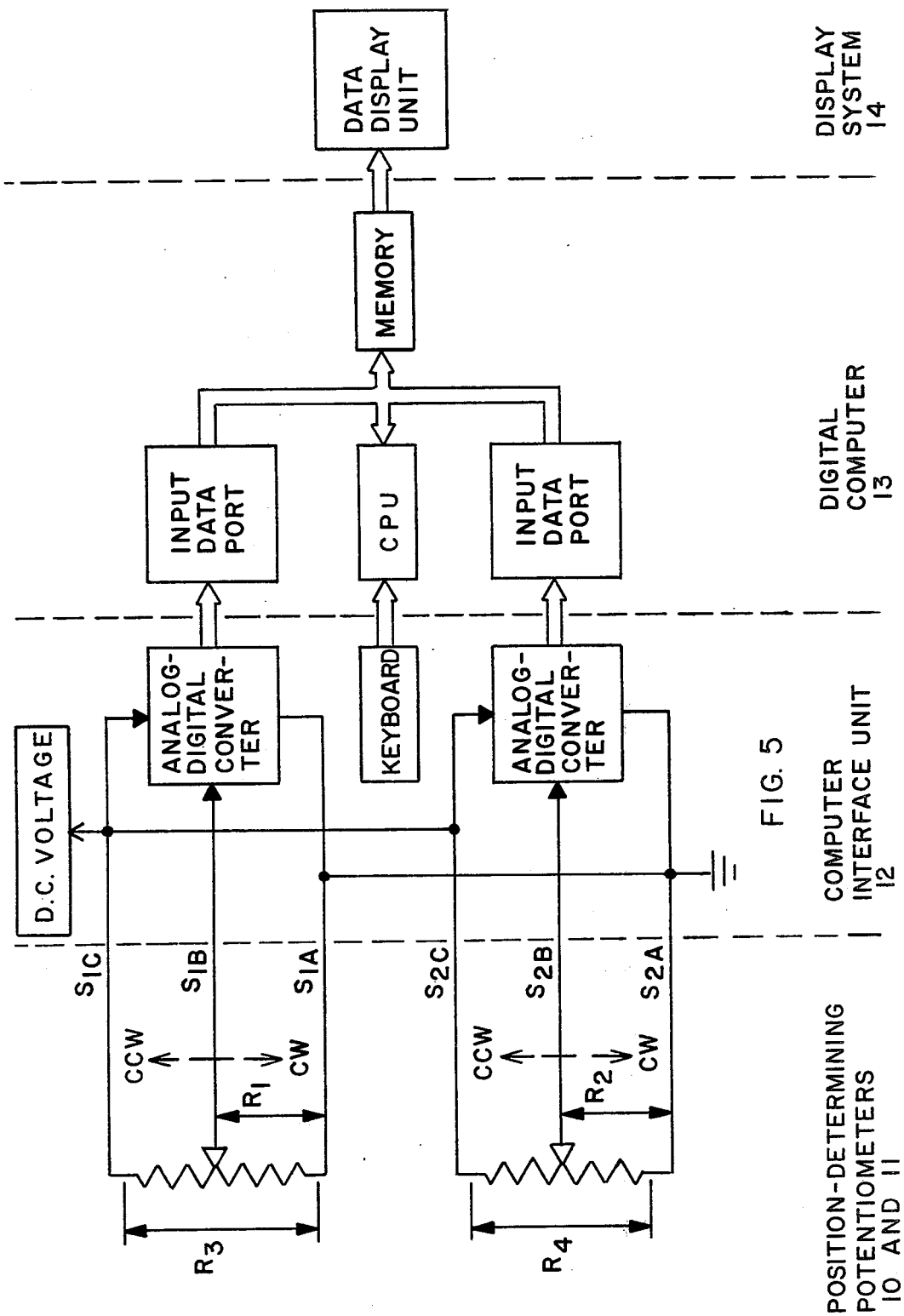

PLANAR COORDINATE RESOLVING SYSTEM

TECHNICAL FIELD

The invention relates to the resolution of position coordinates of points, lines, segments, or regions of a plane surface upon which may be impressed a plane image such as a picture, sketch, drawing, negatives, x-rays or graphical data. The invention is particularly suited to provide resolved position coordinate information in an electrical analog form for conversion to digital format and subsequent processing and storage in a digital computer. Applications include displaying computer-processed forms of the coordinate data such as reproduced tracings of photographs or drawings on a cathode-ray display or hard copy printer.

BACKGROUND ART

The resolution of position coordinates of points, lines, segments, or regions of a plane surface has previously been accomplished by either a direct or indirect method. In the direct method, a measuring instrument such as a ruler or scale or protractor is used to measure length or angular coordinates relative to some fixed reference point. After, or in coincidence with the measurement, the measurement data may be recorded in a suitable data storage device. In the indirect method, a pointer is generally placed over the point on the plane surface whose position is to be resolved. In the process, analog signals corresponding to the coordinates of the point are produced. These analog signals are then conditioned for application to a computing and storage device where they are converted to numbers representing the position coordinates in a convenient coordinate system for the user.

The present invention falls under the general category of indirect methods of planar position coordinate resolution. The state-of-the-art in this category consists of the following two methods of coordinate resolution.

Method A—The image, picture, sketch, or graphical data upon which resolution of position coordinates is desired, is placed in close proximity to an insulated plane surface within which is imbedded a conductive grid network. This conductive network, when excited by a pair of differing types of electrical signals, produces orthogonal potential fields across its plane surface. A data take-off pen or pencil in contact with a given point of the image area whose position coordinates are desired transfers an electrical analog signal that is indicative of electric field potentials at the point and representative of its position coordinates to a computing and storage device, thus recording the location of that point.

Method B—A replica of the image, picture, sketch or graphical data is reflected, normally by use of a 45° optical combining glass, onto the face of a cathode-ray display tube. A cursor is also displayed on the tube face. The coordinates of the cursor are controlled by a computing and storage device. The cursor is caused to trace, and rest upon successive points of the reflected data whose position coordinates are desired. At each point, the cursor coordinates are recorded by the computing and storage device.

Some of the major problems inherent in Methods A and B include the following.

Method A (a) The conducting surface network and supporting circuitry is complex and expensive.

(b) Position coordinate computations must be performed using interpolation techniques since the conductor spacing is typically much wider than the desired image point-to-point resolution.

(c) Signal interference problems are possible due to the constant a-c power excitation applied to the conductive surface.

(d) The close proximity of the human hand may produce extraneous conductive paths and cause position errors to be introduced in the calculation.

Method B (a) A precise and complex optical reflector is required to obtain a low-distortion replica of the desired image onto the curved surface of a cathode-ray tube.

(b) Reproduction errors are possible since position coordinates of the reflected image are obtained rather than those of the original image.

(c) The alignment of the cursor with the image element of interest on the display tube is difficult.

The solutions to the above listed problems are given in the DISCLOSURE OF INVENTION section.

A search of the prior art disclosed two patents Thompson and Heartz, that were directly related to the present invention. Three other patents indirectly related to the present invention were considered in the investigation and evaluation of the prior art. The cited patents are listed below:

| PATENT NUMBER | INVENTOR | ISSUED |
| --- | --- | --- |
| 2,538,226 | Anderson et al | 01/16/51 |
| 2,931,573 | Story | 04/05/60 |
| 3,106,707 | Thompson | 10/08/63 |
| 3,731,995 | Reiffel | 05/08/73 |
| 3,883,861 | Heartz | 05/13/75 |

The Anderson patent describes an analog computing means for solving vector triangles. The Story patent discloses an apparatus which is capable of transforming rectangular coordinates into polar coordinates, or for solving problems which are analogous to such transformation. The Thompson patent discloses an apparatus for transforming planar image data into electrical analog signals using an electrically conductive transparent material and an electrically conductive data take-off pencil. The Reiffel patent incorporates the Thompson invention into an electrical-optical system for producing animated motion pictures. The Heartz patent discloses an apparatus for encoding in digital format and simultaneously displaying a data base descriptive of a land mass or the like. The information being encoded is simultaneously displayed, and compared with the source of the information, which may be a map or photograph.

DISCLOSURE OF INVENTION

The planar coordinate resolving system comprises, in its preferred embodiment: a tracing board having a hinged transparent cover, under which a plane image such as a picture, sketch, drawing, negative, x-ray or graphical data that is to be reproduced is held in place, a first variable resistor where in the preferred embodiment is electrically connected as a potentiometer, also referred to as a first potentiometer; a second variable resistor where in the preferred embodiment is also electrically connected as a potentiometer, and referred to as a second potentiometer; a mechanical pointer; a first housing comprised of a bottom section and a top section, the bottom section having a bore sized to accept and hold in place the first potentiometer and which is also rigidly attached to the upper top surface of the tracing board, the top section having a bore sized to accept and hold in place the shaft of the first potentiometer such that the rotation of the top section is in correspondence with the rotation of the first potentiometer shaft; a second housing, a similarly constructed as the first housing, that houses the second potentiometer and that is free standing (not attached to the tracing board); and a linkage mechanism comprising a first linkage arm and a second linkage arm.

The first linkage arm is attached on one end (first end) to the top section of the first housing while the other end (second end) is attached to the top section of the second housing. In this configuration the first linkage arm is capable of rotary but no lateral movement. The second linkage arm is attached on one end to the bottom section of the free-standing second housing, thereby having both rotary and lateral movements, while the other end is rigidly attached to the mechanical pointer, which is free-standing.

At any position of the mechanical pointer on the tracing board, the combination of resistance values of the first and second potentiometer constitute a unique pair. The first resistance value is a physical analog of the rotational angle of the first linkage arm relative to its defined reference position. The second resistance value is a physical analog of the rotational angle of the second linkage arm relative to its defined reference position. Each of the linkage arms may be conceived of as a vector quantity, having a fixed known length, and a direction angle defined by the resistance value of the potentiometer attached to its first end. The fixed bottom section of the first housing may be defined as a position coordinate zero reference. Since it is desired to know the precise location of the mechanical pointer relative to the zero reference when the pointer is positioned over an image element, the position can be computed directly by vectorially adding the two vector quantities represented by the length and angle of each respective linkage arm. The mechanical pointer position relative to the zero reference can thus be computed in any convenient coordinate system. The resistance values of the two potentiometers are converted to two digital numbers in a computer interface unit containing an analog-to-digital converter. The digital numbers are then entered into a digital computer, where the vectorial addition is performed, and finally may be displayed on a cathode ray display tube. Additionally, a coordinate transformation to cartesian (rectangular) coordinates is performed in the computer to facilitate the display of the image on an image display device.

The solution to the problems inherent in the prior art versions of image reproducers as listed in the BACKGROUND ART section follow—each letter preceding the solution corresponds to the problem letter:

Method A (a) The tracing board surface is simple, inexpensive, and contains no internal wiring or supporting circuitry.

(b) Position coordinates are very accurate since the analog signals correspond to position coordinates of the original image.

(c) Signal interference problems are minimized since no electric analog signals come into proximity with the tracing board.

(d) The close proximity of human hands has no effect on position calculations.

Method B (a) An optical reflector is not required.

(b) Reproduction errors are minimized since the mechanical pointer is placed directly over the image to be reproduced.

(c) The alignment of the pointer with the image element is easily accomplished.

In addition to solving many of the problems inherent in existing systems, it is also an objective of the invention to provide a planar coordinate resolving system that:

Requires no extensive training to operate,
Will interface with standard digital computing equipment,
Will provide image, picture, sketch, or graphical data for extensive collection and storage, or for display on a wide variety of display media, and that
May be used to compute plane geometric features such as length, distance, area of image, picture, sketch, or graphical data.

BRIEF DESCRIPTION OF DRAWINGS

The details of the invention are described in connection with the accompanying drawings in which:

FIG. 5 illustrates a typical computer interface to the invention, including an electrical schematic of the position-determining potentiometers of the invention.

BEST MODE FOR CARRYING OUT THE INVENTION

Figure 1:
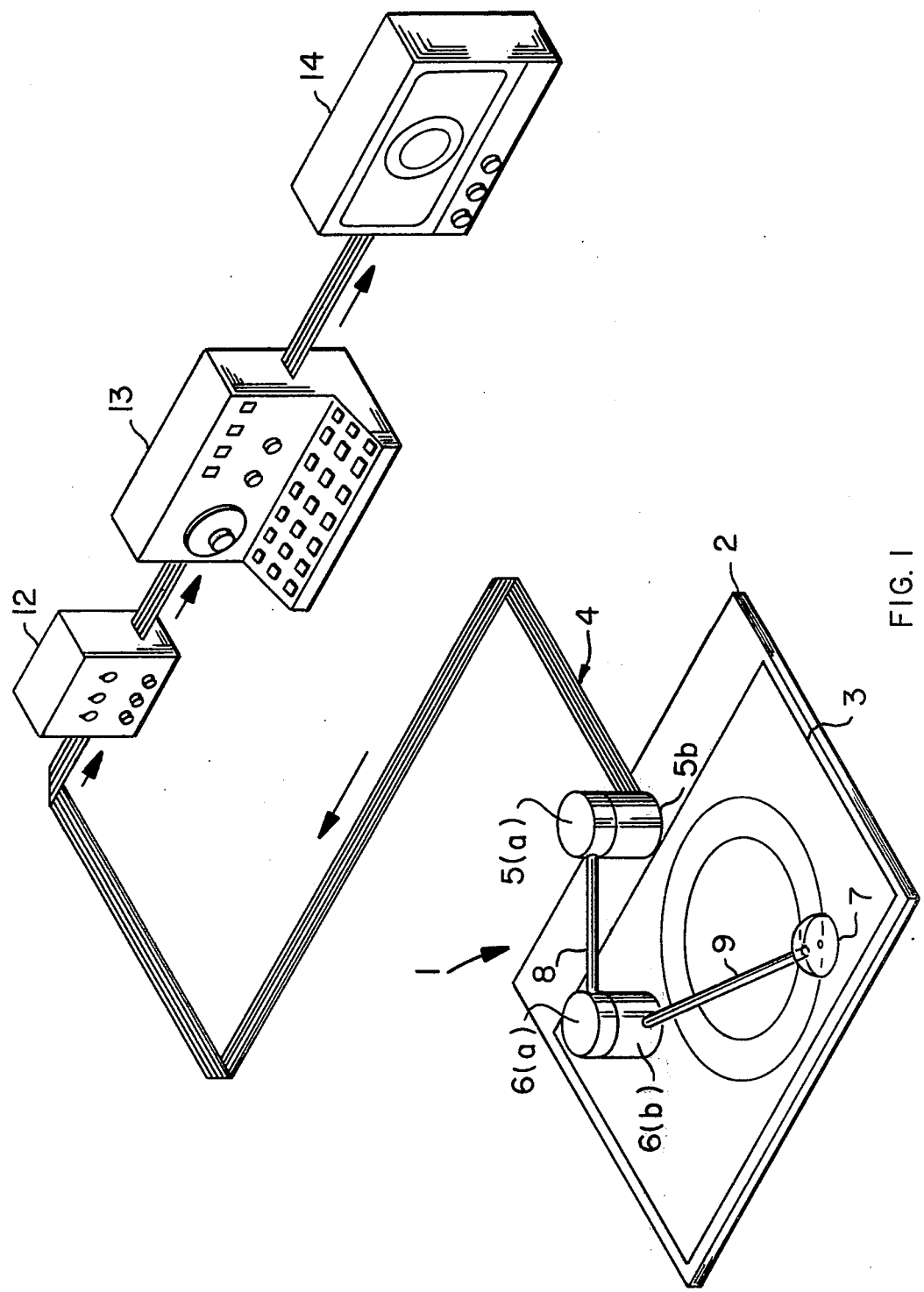
FIG. 1 is an overall isometric view of the planar coordinate resolving system showing an electrical interface connection to an existing digital computing means, which in turn is connected to a data display means.

The Planar Coordinate Resolving System 1 is depicted in FIGS. 1 through 5. The System 1, as shown in FIG. 1, is designed to be used in combination with an existing subsystem comprising a computer interface unit 12; a digital computer 13; and a data display unit 14.

The five FIGURES depict a System 1 that is comprised of ten major elements: a tracing board 2; a transparent cover 3 hinged to the upper top surface of the tracing board; a first housing 5 comprising a top section 5a and a bottom section 5b; a second housing 6 comprising a top section 6a and a bottom section 6b; a first variable resistor 10, also referred to as a first potentiometer, housed by the first housing 5; a second variable resistor 11, also referred to as a second potentiometer, housed by the second housing 6, where each variable resistor 10, 11 has three terminals, two across a fixed resistive element and one connected to a rotating wiper; a mechanical pointer 7; a first linkage arm 8, consisting of a rigid rod having a bore therein, where its first end is rigidly attached to the top section 5a of the first housing 5, and its second end is attached to the top section 6a of the second housing 6; a second linkage arm 9 consisting of a rigid rod, where its first end is attached to the bottom section 6b is the second housing 6, and its second end is attached to the mechanical pointer 7; and an electrical cable 4. The tracing board 2 may be made of transparent or translucent material to allow illuminated photographic negatives or x-rays to be resolved.

In the electrical cable 4, there are a total of six conductors terminating at the computer interface unit 12; three are from the first potentiometer 10 and three are from the second potentiometer 11. The three conductors from the second potentiometer 11 are routed through the bore in the first linkage arm 8 and combine with the three conductors from the first potentiometer 10 in the first housing 5. From the housing 5 the six conductors terminate at the computer interface unit 12. An elevation view showing the connection of the linkage arms to the housings and cursor is included as FIG. 2. In the best mode the first and second potentiometers are identical. Each is a single turn linear device having a resistance value of 20,000 ohms ±3 percent with a linearity of ±0.5 percent. The part number is SW22C and is distributed by Electro-Techniques of Oceanside, Calif. U.S.A.

The bottom section 5b of housing 5 is attached firmly to the tracing board 2. Housing 6 moves freely over the transparent cover 3 as top section 5a and linkage arm 8 rotate about the housing 5 axis.

The rigid linkage arm 9 is firmly attached on one end to the lower housing section 6b and on its other end to the mechanical pointer 7. The mechanical pointer 7 has a transparent body 7a whose lower surface moves smoothly over the surface of the transparent cover 3 and on whose lower surface centroid is inscribed a pointer index 7b, visible through the pointer body 7a.

Figure 3:
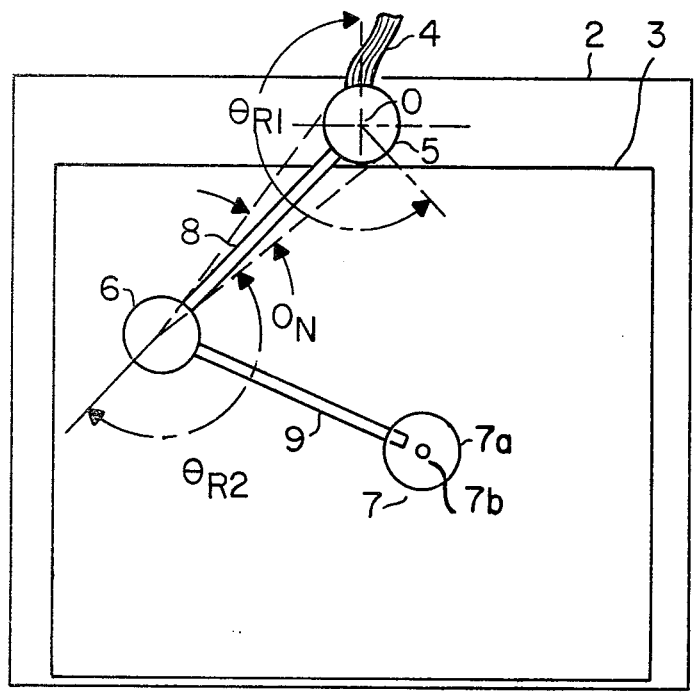
FIG. 3 is a plan view of the preferred embodiment.
Figure 2:
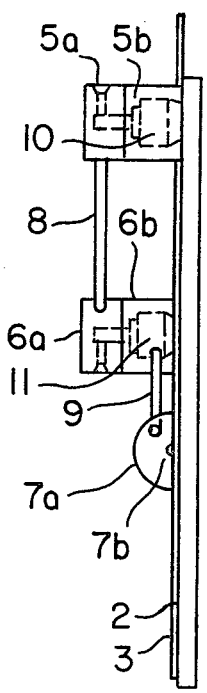
FIG. 2 is an elevation view of the preferred embodiment.

Referring to FIG. 3, a description of the movement of the linkage arms 8 and 9, and positions of the mechanical pointer 7 can be stated. A horizontal and vertical dashed line intersect at an origin point O. The intersection occurs at junction of the horizontal and vertical axes of the housing 5. The origin point O is fixed relative to the tracing board 2 and is to be considered the origin for determining position coordinates of the mechanical pointer index 7b. Full rotation of the linkage arm 8 is possible, but in practice, it is restricted to an excursion $\theta_{R1}$ as indicated in FIG. 3. As the linkage arm 8 is rotated relative to the origin point O, the vertical axis of the housing 6 may be considered a moving reference point A. Whereever the position of point A may be, nearly full rotational travel of the linkage arm 9 about reference point A is possible limited only by the angle $\theta_N$, the sector occupied by the linkage arm 8 and the first housing 5. In practice, however, the linkage arm 8 is restricted to an excursion $\theta_{R2}$ as shown in FIG. 3. The lengths of the two linkage arms 8 and 9 are chosen to allow the mechanical pointer 7 to be placed directly over any point of an image under the transparent cover 3.

Figure 4:
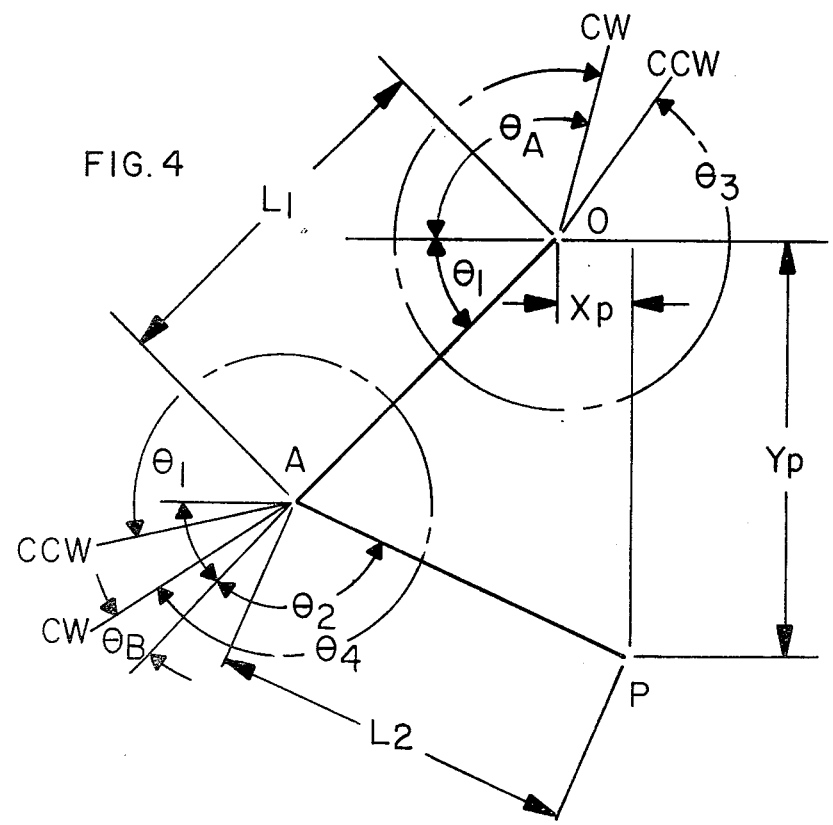
FIG. 4 is a geometrical vector diagram, illustrating the determination of the position coordinates of the mechanical pointer when the linkage arms are in a typical position.

An explanation of how the positional coordinates of the mechanical pointer 7 may be determined follows. FIG. 4 is a geometric drawing showing two straight line segments OA and AP connected at point A. As illustrated in FIG. 3 the length of line segment $L_1$ represents the distance between the origin point O and the moving reference point A. Similarly, the length $L_2$ represents the distance between the mechanical pointer index P and the moving reference point A. This orientation of line segments $L_1$ and $L_2$ represents a typical resting position of the mechanical pointer, whose position relative to the origin point O is to be calculated.

The lengths $L_1$ and $L_2$ are known to a high precision and remain constant through any lateral or rotational movement. The distance OP may be found by vector addition of the two line segments $L_1$ and $L_2$. Since their lengths are known, it is only required to additionally measure their rotational angles relative to some reference line. A horizontal reference line through origin point O is a convenient reference line since one border of the image to be reproduced is normally positioned parallel to this reference line. A vector at an angle of 0° will point horizontally to the left from the origin point O.

The absolute angle of vector $L_1$ relative to the horizontal reference line is equal to $\theta_1$. Similarly, the absolute angle of vector $L_2$ relative to the horizontal reference line is $\theta_1 + \theta_2$, as illustrated in FIG. 4. The position coordinates of point P relative to point O and $X_p$ and $Y_p$. These coordinates may be may be computed using vector addition formulas:

$$X_p = L_1 \cos \theta_1 + L_2 \cos(\theta_1 + \theta_2) \tag{1}$$

$$Y_p = L_1 \sin \theta_1 + L_2 \sin(\theta_1 + \theta_2) \tag{2}$$

An electrical schematic of the position-determining elements of the invention, namely potentiometers 10 and 11, are shown in FIG. 5.

The angles $\theta_1$ and $\theta_2$ of FIG. 4 are related to the resistance values of the potentiometers 10 and 11 in the following manner: In the preferred embodiment, the potentiometers are single-turn variable linear resistors having total resistances $R_3$ and $R_4$ respectively. As linkage arm 8 causes upper housing section 5b to rotate relative to its mating section 5a, the first potentiometer 10 resistance $R_1$ between the rotor terminal $S_{1B}$ and stator terminal $S_{1A}$ varies linearly with the rotation angle. Similarly the second potentiometer 11 resistance $R_2$ between the rotor terminal $S_{2B}$ and stator terminal $S_{2A}$ varies linearly with the rotation angle as the linkage arm 9 causes the lower housing section 6a to rotate relative to its mating section 6b. Referring to FIG. 4, the excusion angles corresponding to $R_3$ and $R_4$ and $\theta_3$ and $\theta_4$ respectively. The excusion angle corresponding to $R_1$ is composed of $\theta_A + \theta_1$. Angle $\theta_A$ represents the constant angle between the zero reference line for angle $\theta_1$ and the position of the linkage arm 8 where $R_1 = 0$. Similarly, angle $\theta_B$ is that constant angle between the zero reference line for angle $\theta_2$ (an extension of line segment $L_1$) and the position of the linkage arm 9 relative to the linkage arm 8 where $R_2 = 0$.

Due to the linear nature of potentiometers 10 and 11, the following proportional relationships apply:

$$(\theta_A + \theta_1)/\theta_3 = R_1/R_3 \tag{3}$$

$$(\theta_B + \theta_2)/\theta_4 = R_2/R_4 \tag{4}$$

In equation 3, angles $\theta_A$ and $\theta_3$ are constant, and may be stored in a computer memory. This applies also to angles $\theta_B$ and $\theta_4$ in equation 4. In the best mode of the invention, the ratios $R_1/R_3$ and $R_2/R_4$ are measured indirectly by applying a voltage across the stator terminals of the potentiometers 10 and 11, and applying the resultant voltages across $R_1$ and $R_2$ to analog-to-digital converters. As a result, the angles $\theta_1$ and $\theta_2$ may be expressed in terms of the known angles $\theta_A$, $\theta_B$, $\theta_3$ and $\theta_4$, and the measured ratios $R_1/R_3$ and $R_2/R_4$. Rearranging equation (3) and (4):

$$\theta_1 = (R_1/R_3) \cdot \theta_3 - \theta_A = K_1 \theta_3 - \theta_A \tag{5}$$

where $K_1$ has been substituted for the measurement: $R_1/R_3$.

$$\theta_2=(R_2/R_4)\cdot\theta_4-\theta_B=K_2\theta_4-\theta_B \tag{6}$$

where $K_2$ has been substituted for the measurement: $R_2/R_4$.

These expressions for $\theta_1$ and $\theta_2$ may be substituted in equations (1) and (2) in order to obtain computational equations for the position coordinates $X_p$ and $Y_p$ of mechanical pointer index P:

$$X_p=L_1 \cos (K_1\theta_3-\theta_A)+L_2 \cos (K_1\theta_3 K_2\theta_4-\theta_A-\theta_B) \tag{7}$$

$$Y_p=L_1 \sin (K_1\theta_3-\theta_A)+L_2 \sin (K_1\theta_3+K_2\theta_4-\theta_A-\theta_B) \tag{8}$$

Equations (7) and (8) define the rectangular position coordinates of the mechanical pointer index P in terms of known quantities $L_1$, $L_2$, $\theta_A$, $\theta_B$, $\theta_3$, $\theta_4$ and measured quantities $K_1$ and $K_2$.

In the best mode of this invention, the computations (7) and (8) are carried out in a digital computer. In other modes of the invention, nonlinear variable resistors may be substituted for the linear potentiometers 10 and 11. In those cases, the precise nonlinear relationship between resistance and rotation angle must be stored in the computer in order to obtain correct position coordinate computations.

FIG. 5 presents an electrical schematic of the potentiometers 10 and 11 and a typical interface to a digital computer, storage and display system. Analog voltages proportional to the ratios $K_1$ and $K_2$ (equations 5 and 6) are produced by application of the D.C. voltage to each potentiometer. The resulting voltage drops across $R_1$ and $R_2$, respectively, are proportional to the ratios $K_1$ and $K_2$. These voltages are applied to analog-to-digital converters, resulting in digital number equivalents of $K_1$ and $K_2$ being made available to the digital computer.

When the operator has selected a point, line, segment, or region of the plane image such as a picture, sketch, drawing, negative, x-ray or graphical data by positioning the mechanical pointer index 7b on the desired initial point, the computations can be initiated by a keyboard entry. At the computer's sampling rate, position coordinates of the initial point and subsequent points that the mechanical pointer index 7b is caused to rest upon are computed and stored in the computer's memory. Subsequent to or in the course of these computations, the position coordinates may also be stored or transferred to a display memory dedicated to a display device such as a CRT display or hard-copy printer. This application is also illustrated in FIG. 5.

A major object of this invention has been to incorporate precision linear potentiometers as a major position coordinate determining element into a simple mechanical design that overcomes drawbacks of planar coordinate resolving systems in use today. In the preferred embodiment the variable resistors 10, 11 are connected as three-terminal potentiometers. However, in other embodiments the potentiometers 10, 11 may be connected as two-terminal rheostats.

I claim:

1. A planar coordinate resolving system used in combination with an existing subsystem comprising a computer interface unit, a digital computer, and a data display unit, where said system comprises:

a. a tracing board;
b. a first variable resistor having a resistance adjustment shaft and an outer case rigidly attached to said tracing board;
c. a second variable resistor having a resistance adjustment shaft and an outer case;
d. a first linkage arm having one end rigidly attached to the shaft of said first variable resistor and the other end to the shaft of said second variable resistor;
e. a mechanical pointer for locating position of a plane image placed adjacent to said tracing board;
f. a second linkage arm having one end rigidly attached to the outer case of said second variable resistor and the other end rigidly attached to said pointer;
g. means for generating electrical analog signals corresponding to resistance values of said first variable resistor and said second variable resistor;
h. means for applying said electrical analog signals corresponding to said first variable resistor and said second variable resistor to said computer interface unit where the signals are converted to digital data bits for subsequent application to said digital computer and said data display unit.

2. A planar coordinate resolving system used in combination with an existing subsystem comprising a computer interface unit, a digital computer, and a data display unit, where said system comprises:

a. a tracing board;
b. a transparent cover hingedly attached to the upper top portion of said tracing board, whereby when lifted a plane image can be inserted and held in place between said cover and said tracing board;
c. a first variable resistor having a resistance adjustment shaft and an outer case;
d. a second variable resistor having a resistance adjustment shaft and an outer case;
e. a first housing consisting of a top section and a bottom section with the top section having a bore sized to accommodate and secure the shaft of said first variable resistor and with the bottom section having a bore sized to accommodate and secure the case of said first variable resistor, where bottom section is rigidly attached to the upper top surface of said tracing board and where top section freely rotates in correspondence with the shaft of said first variable resistor;
f. a second housing consisting of a top section and a bottom section with the top section having a bore sized to accommodate and secure the shaft of said second variable resistor and with the bottom section having a bore sized to accommodate and secure the case of said second variable resistor, where bottom section is free standing and where top section freely rotates in correspondence with the shaft of said second variable resistor;
g. a first linkage arm having one end rigidly attached to top section of said first housing and the other end rigidly attached to the top section of said second housing;
h. a mechanical pointer for locating position of graphical data on drawing on picture held in said tracing board;
i. a second linkage arm having one end rigidly attached to bottom section of said second housing and the other end rigidly attached to one side of said pointer;

j. means for generating electrical analog signals corresponding to resistance values of said first variable resistor and said second variable resistor;

k. means for applying said electrical analog signals corresponding to said first variable resistor and said second variable resistor to said computer interface unit where the signals are converted to digital data bits for subsequent application to said digital computer and said data display unit.

3. The system as specified in claim 1 or 2 wherein said first variable resistor and said second variable resistor are connected as three-terminal potentiometers, where two of the terminals are across a fixed resistive element and the third is connected to a rotating wiper.

4. The system as specified in claim 3 wherein means for generating said electrical analog signals from said first variable resistor and said second variable resistor is accomplished by applying a d-c reference voltage across the terminals of the fixed resistive element of said first and second variable resistors and using the d-c voltage produced between the terminal of the rotating wiper and one of the fixed terminals of each said variable resistors as the two electrical analog signals.

5. The system as specified in claim 4 wherein said first linkage arm comprises a rod having a bore therein for housing a plurality of electrical conductors for carrying said electrical analog signals from said second variable resistor and where said electrical conductors terminate with the conductors from said first variable resistor at said computer interface unit.

6. The system as specified in claim 5 wherein means for applying the electrical analog signals from said first variable resistor and said second variable resistor to said computer interface unit is by an electrical cable having a plurality of conductors.

7. The system as specified in claim 1 or 2 wherein said first variable resistor and said second variable resistor are connected as two-terminal rheostats.

8. The system as specified in claim 2 wherein top sections of said first housing, top sections of said second housing, and said first linkage arm connecting the top sections of the two housings is molded in one piece, with linkage arm having a bore to house the means for applying electrical analog signals from said second variable resistor to said computer interface unit.

9. The system as specified in claim 3 wherein said first linkage arm and said second linkage arm are mechanically adjustable in length.

* * * * *